(12) United States Patent
Shao

(10) Patent No.: US 8,210,614 B2
(45) Date of Patent: Jul. 3, 2012

(54) INTERLOCK FOR A SEAT RECLINER MECHANISM

(75) Inventor: Yi Shao, Canton, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/985,285

(22) Filed: Jan. 5, 2011

(65) Prior Publication Data

US 2011/0095589 A1    Apr. 28, 2011

Related U.S. Application Data

(62) Division of application No. 11/405,764, filed on Apr. 18, 2006, now Pat. No. 7,887,134.

(60) Provisional application No. 60/673,231, filed on Apr. 20, 2005.

(51) Int. Cl.
   *B60N 2/02* (2006.01)

(52) U.S. Cl. ............ 297/378.12; 297/378.1; 297/378.14

(58) Field of Classification Search ............. 297/378.12, 297/378.1, 378.14, 344.11, 378.11
   See application file for complete search history.

(56) References Cited

U.S. PATENT DOCUMENTS

| | | |
|---|---|---|
| 4,629,252 A | 12/1986 | Myers et al. |
| 4,997,223 A | 3/1991 | Croft |
| 5,265,937 A | 11/1993 | Allen |
| 5,393,116 A | 2/1995 | Bolsworth et al. |
| 5,460,429 A | 10/1995 | Whalen |
| 5,529,378 A | 6/1996 | Chaban et al. |
| 5,678,895 A | 10/1997 | Matsuura et al. |
| 5,718,481 A | 2/1998 | Robinson |
| 5,788,330 A | 8/1998 | Ryan |
| 6,139,104 A | 10/2000 | Brewer |
| 6,152,533 A | 11/2000 | Smuk |
| 6,290,297 B1 | 9/2001 | Yu |
| 6,328,381 B1 | 12/2001 | Smuk |
| 6,332,647 B1 | 12/2001 | Yoshida et al. |
| 6,336,679 B1 | 1/2002 | Smuk |
| 6,454,355 B2 | 9/2002 | Biletskiy |
| 6,746,082 B2 | 6/2004 | Oberbeck et al. |
| 6,827,404 B2 | 12/2004 | Blair et al. |
| 6,905,173 B2 | 6/2005 | Tame et al. |
| 7,025,422 B2 * | 4/2006 | Fast ........................ 297/378.14 |

(Continued)

OTHER PUBLICATIONS

Advisory Action mailed Sep. 21, 2010 in U.S. Appl. No. 11/405,764, 3 pages.

(Continued)

*Primary Examiner* — Sarah B McPartlin
(74) *Attorney, Agent, or Firm* — Foley & Lardner LLP

(57) ABSTRACT

A seat control mechanism for a seat frame has an interlock device that includes a lock plate slidably coupled to a seatback for movement between a locked and a released position. A stop bracket is coupled to a seat bottom and has a first end engageable with the lock plate in the locked position when the seatback is in a full-forward position and a second end engageable with the lock plate in the locked position when the seat back is in a fold-flat position. An actuator moves the lock plate from the locked to the released position to release the lock plate and permit movement of the seatback between the full-forward position and the fold-flat position. The lock plate is biased toward the locked position to engage the ends of the stop bracket to lock the seat back in either the full-forward or the fold-flat position after releasing the actuator.

8 Claims, 10 Drawing Sheets

U.S. PATENT DOCUMENTS

| | | | | |
|---|---|---|---|---|
| 7,086,698 B2 * | 8/2006 | Shiraki | ..................... | 297/367 R |
| 2002/0135216 A1 | 9/2002 | Hamelin et al. | | |
| 2002/0185904 A1 * | 12/2002 | Carlson et al. | ........... | 297/378.12 |
| 2004/0217638 A1 | 11/2004 | Shao | | |
| 2005/0212341 A1 | 9/2005 | Coughlin et al. | | |
| 2007/0152487 A1 | 7/2007 | Brockman et al. | | |

OTHER PUBLICATIONS

Final Office Action mailed Jun. 18, 2010 in U.S. Appl. No. 11/405,764, 9 pages.
Final Office Action mailed May 19, 2008 in U.S. Appl. No. 11/405,764, 9 pages.
Non-Final Office Action mailed Dec. 5, 2007 in U.S. Appl. No. 11/405,764, 9 pages.
Non-Final Office Action mailed Feb. 9, 2009 in U.S. Appl. No. 11/405,764, 8 pages.
Non-Final Office Action mailed Oct. 23, 2009 in U.S. Appl. No. 11/405,764, 8 pages.
Notice of Allowance mailed Nov. 15, 2010 in U.S. Appl. No. 11/405,764, 4 pages.

* cited by examiner

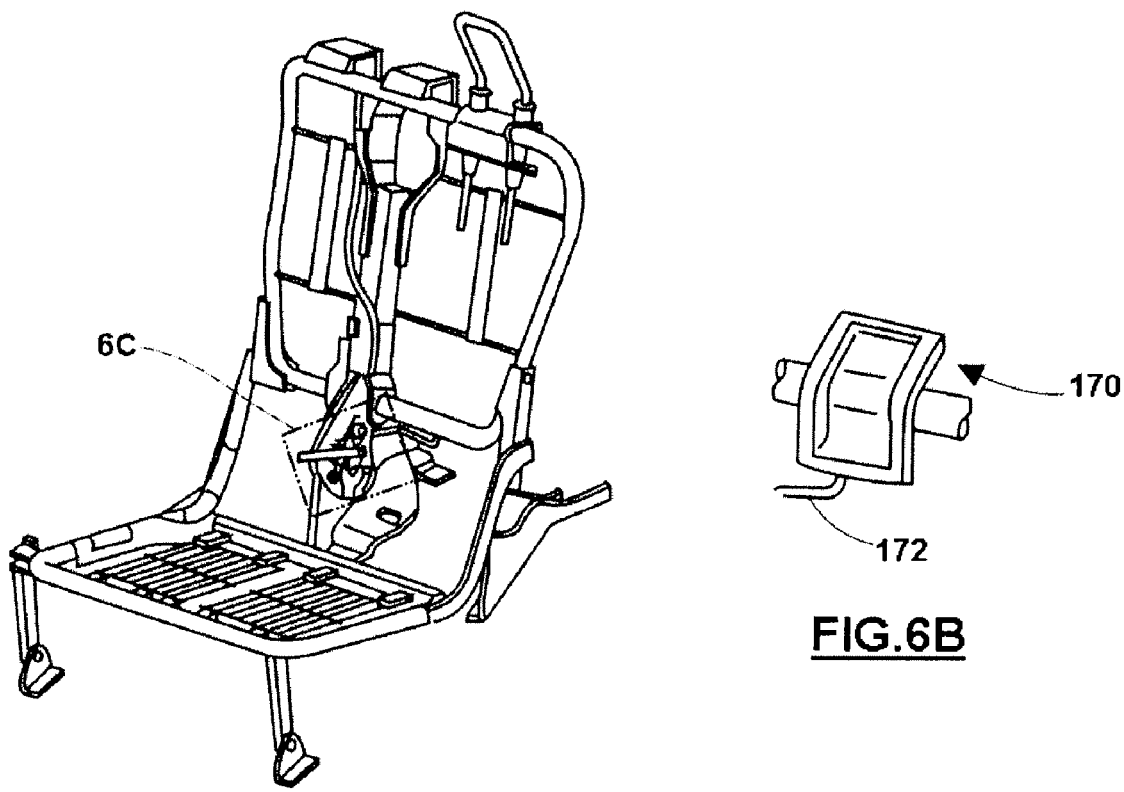
FIG.6A
FIG.6B
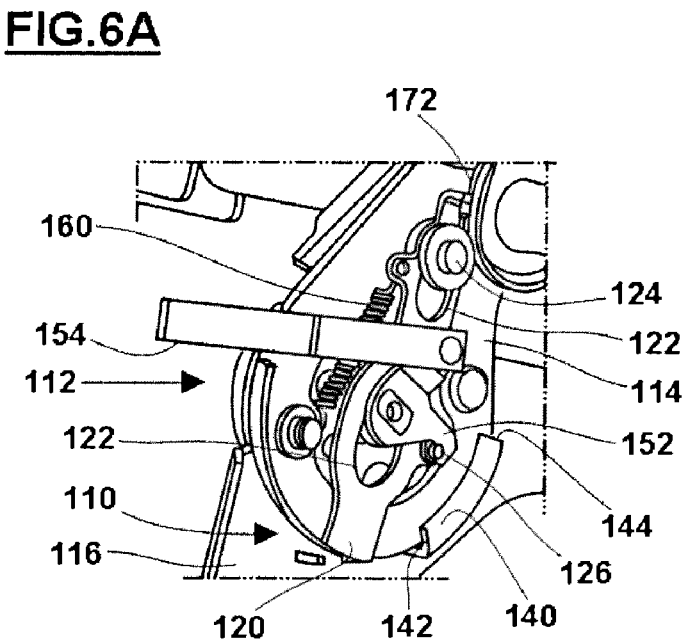
FIG.6C

INTERLOCK FOR A SEAT RECLINER MECHANISM

CROSS REFERENCE TO RELATED APPLICATIONS

The present application is a divisional of U.S. application Ser. No. 11/405,764 filed Apr. 18, 2006, which claims the benefit of priority under 35 U.S.C. §119(e) to U.S. Provisional Patent Application No. 60/673,231, titled Interlock for a Seat Recliner Mechanism, filed on Apr. 20, 2005. The foregoing applications are incorporated by reference herein in their entirety.

BACKGROUND

The present invention relates generally to the field of seat recliner mechanisms for use in vehicles (e.g., automobiles such as cars, trucks, and the like; airplanes, boats, etc.). More specifically, the present invention relates to a seat control mechanism having an interlock for use with a recliner mechanism. Further, the present inventions relates to an interlock for use with a single-pivot recliner mechanism for locking a seat back in a full forward position and a traditionally fold-flat position.

Seat recliner mechanisms for pivoting a seatback relative to a seat bottom are generally known. Such seat recliner mechanisms are often manually adjustable and capable of pivoting a seatback within a seat-use range generally considered to be between a full-reclined position and a full-forward position (e.g. "dump" position to provide access to the vehicle behind the seat). The known seat recliner mechanisms may also be capable of permitting a seatback to be pivoted forward, past the full-forward position, to a fold-flat position where the seatback is oriented horizontally over the seat bottom (e.g. in a "clamshell" position to provide a platform for cargo storage or the like). Typically, seat recliner mechanisms capable of positioning the seat back in a fold-flat position are of a "multiple pivot axis" type and include a first pivot axis for adjusting the seatback within the seat-use range, and a second pivot axis for adjusting the seat back between the seat-use range and the fold-flat position. However, such multiple pivot axis recliners tend to be relatively complex, large and complicated mechanisms having multiple handles or levers for positioning the seatback in the desired location.

Seat recliner mechanisms for use in a fold-flat application may also be provided with a single pivot axis, about which the seatback is adjustable within the seat use range, and is also movable from the seat use range to the fold flat position. However, such single-pivot recliner mechanisms typically are not "lockable" in the full-forward position (e.g. to prevent inadvertent "collapse" of the seatback beyond the full-forward position into a "clamshell" configuration when recliner mechanism is activated) and in the fold-flat position (e.g. to prevent inadvertent "lifting" or other unintended movement of the seatback once it has been placed in the fold-flat position).

Accordingly, it would be desirable to provide a seat control mechanism having an interlock device for use with a recliner mechanism to prevent movement of the seatback beyond a full-forward position during adjustment of the seatback within the seat-use range. It would also be desirable to provide an interlock device to prevent movement of the seatback from a fold-flat position after the seat has been moved to the fold-flat position. It would also be desirable to provide an interlock device for use with a seat recliner mechanism having a single pivot axis. It would also be desirable to provide an interlock having an activation handle that is integrated with an activation handle of the seat recliner mechanism (e.g. a "single" handle). It would also be desirable to provide an interlock device having a single handle that is movable within a first range to adjust the seatback within the seat-use range and is movable within a second range to permit movement of the seatback to/from the fold-flat position. It would also be desirable to provide an interlock device having an interlock activation handle that is separate from a seat recliner activation handle. It would be further desirable to provide an interlock handle that cooperates with the seat recliner handle so that activation of the seat recliner handle does not release the interlock, and so that activation of the interlock handle releases the seat recliner mechanism.

Accordingly, it would be desirable to provide a seat control mechanism having an interlock for a seat recliner mechanism having any one or more of these or other advantageous features.

SUMMARY

According to one embodiment, a seat control mechanism includes an interlock device for use with a seat recliner mechanism on a seat frame having a seatback pivotally coupled to a seat bottom. The mechanism includes a lock plate slidably coupled to seatback for movement between a locked position and a released position. A stop bracket is coupled to the seat bottom and has a first end engageable with the lock plate in the locked position when the seatback is in a full-forward position and a second end engageable with the lock plate in the locked position when the seat back is in the fold-flat position. An actuator is coupled to the seat back and is operable to move the lock plate from the locked position to the released position to release the lock plate and permit movement of the seatback between the full-forward position and the fold-flat position. The lock plate is biased toward the locked position so that the lock plate engages the ends of the stop bracket to lock the seat back in either the full-forward position or the fold-flat position after the actuator is released.

According to another embodiment, a seat control mechanism includes an interlock device for a seat recliner mechanism includes a lock plate coupled to one of a seatback frame and a seat bottom frame and a stop bracket coupled to the other of the seatback frame and a seat bottom frame. An actuator operates to move the lock plate from a locked position to a release position so that the seat back is movable between a full-forward position and a fold-flat position and a biasing device returns the lock plate to the locked position when the seat back is moved to either the full-forward position or the fold-flat position. The actuator is a single handle configured to move a first distance to permit adjustment of the recliner mechanism and a second distance to release the lock plate from the stop bracket. The lock plate includes at least one axial slot configured to guide the lock plate in a reciprocating manner between the locked position and the released position.

According to a further embodiment, a seat control mechanism includes an interlock device for a seat recliner mechanism includes a lock plate slidably mounted to a seatback frame for movement between a locked position and a released position. A stop bracket is fixed to a seat bottom frame and includes a first end configured to engage the lock plate in the locked position when the seatback frame is in a full-forward position to prevent movement of the seatback frame in a forward direction. The stop bracket includes a second end configured to engage the lock plate in the locked position when the seatback frame is in a fold-flat position to prevent movement of the seatback frame in a reverse direction. A first actuator is coupled to the lock plate and is operable to move the lock plate toward the released position and is configured to activate a second actuator to release the seat retainer mechanism. A biasing device is coupled to the lock plate and the seatback frame to urge the lock plate toward the locked position. The second actuator is configured to release the seat retainer mechanism without releasing the lock plate so that the seat back frame is adjustable with a seat-use range but is prevented from moving beyond the full-forward position until the first actuator is activated.

BRIEF DESCRIPTION OF THE DRAWINGS

FIGS. 6A-6C are schematic perspective views of a seat back in a reclined position with an interlock for a seat recliner mechanism according to another exemplary embodiment.

DETAILED DESCRIPTION

Figure 1A:
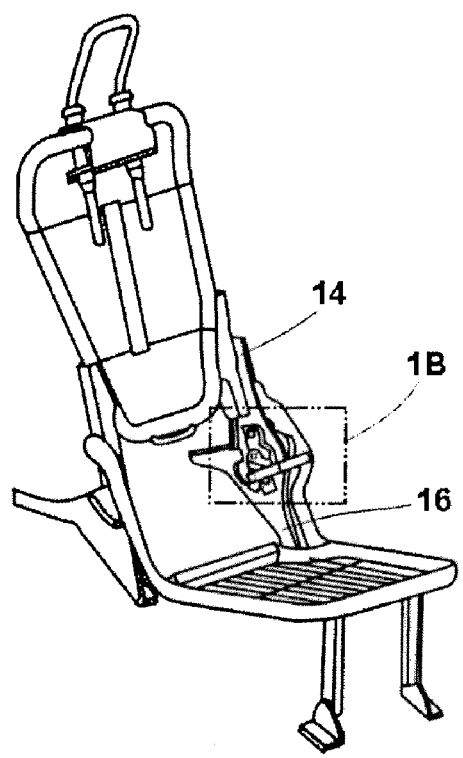
FIGS. 1A and 1B are schematic perspective views of a seat frame in a reclined position with an interlock for a seat recliner mechanism according to an exemplary embodiment.
Figure 1B:
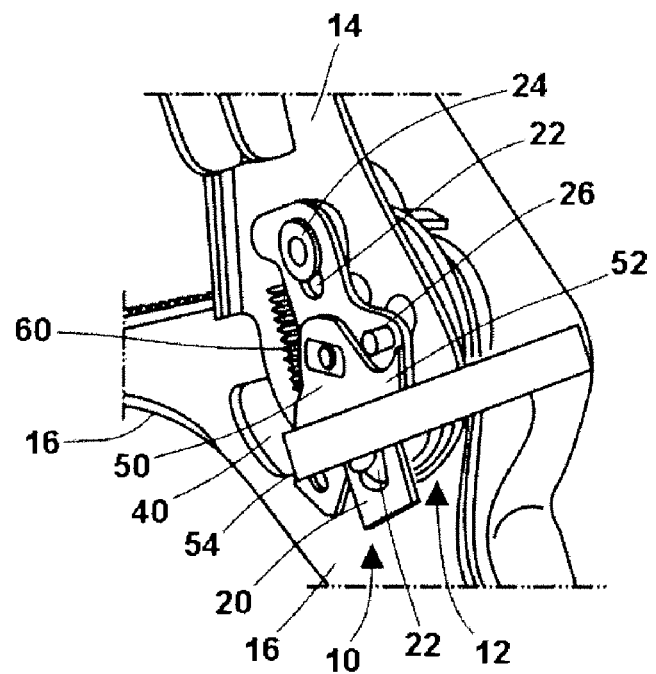

FIGS. 1-10A illustrate exemplary embodiments of a component or assembly shown as an interlock device for a seat recliner mechanism for use in releasably locking the position of a seatback in one or more desired positions in a vehicle (e.g., automobiles such as cars, trucks, sport utility vehicles, minivans, buses, and the like; airplanes, boats, etc.). The interlock device may be provided in a wide variety of sizes, shapes, and configurations, and with various accessories or hardware for cooperating with a seat recliner mechanism to releasably lock a vehicle seatback in any desired position in the vehicle or improving its functionality according to various exemplary embodiments. The interlock device is shown and described for use with a seat recliner mechanism of a single pivot axis type, but may be used with recliner mechanisms having multiple seatback pivot axes. Accordingly, all such configurations are intended to be within the scope of the inventions.

Referring to FIGS. 1-5, a component assembly shown as an interlock device 10 for a seat recliner assembly 12 is shown according to one exemplary embodiment. Interlock device 10 includes a lock plate 20 (e.g. slide bar, etc.), a stop bracket 40, an actuator (shown as handle member 50) and a biasing device (e.g. spring 60 shown as a coil-type spring coupled between a seatback frame and the lock plate). Lock plate 20 is shown coupled to a seat back frame 14 by a pair of slotted apertures 22 engaging a pair of projections (shown as posts 24). Apertures 22 are intended to guide the axially-reciprocating, sliding movement of lock plate 20 between a locked position and a released position. Lock plate 20 is also shown to include a projection (shown as a pin member 26) configured to engage a lever 52 extending from handle 50 to "shift" lock plate 20 from the locked position to the released position when handle 50 is activated.

Referring further to FIGS. 1-5, stop bracket 40 is shown as a generally L-shaped member fixed to a seat bottom frame 16 and having a curved profile configured to correspond generally to curved surface 18 of seatback frame 14. The width W of stop bracket 40 and the location of stop bracket 40 on the seat bottom frame 16 are intended to permit establishing a "first interlock" at a full-forward position of seatback frame 14 (see FIG. 3) and a "second interlock" at a fold-flat position of seatback frame 14 (see FIG. 5). In the locked position, lock plate 20 extends outwardly from curved surface 18 a sufficient amount to engage a first end 42 of stop bracket 40 when seat back frame 14 is in the full forward position. The interaction of lock plate 20 and first end 42 of the fixed stop bracket (see FIG. 3) is intended to create a first interlock that substantially prevents further movement of seatback frame 14 beyond the full-forward position (e.g. to prevent inadvertent "collapse" or "closure" of the seatback frame into a "clamshell" configuration) during adjustment of the seatback frame within the normal seat-use range.

Figure 2A:
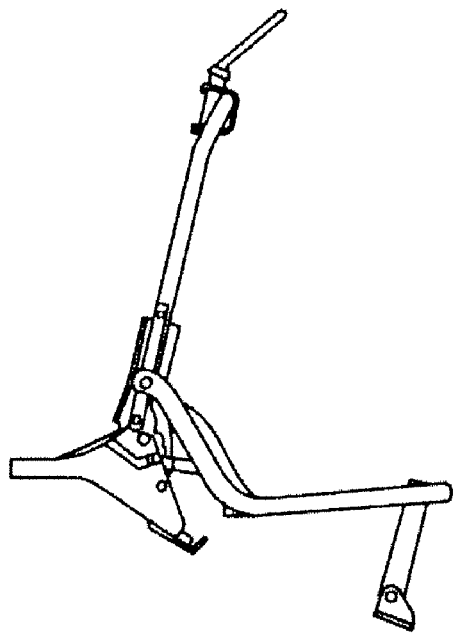
FIGS. 2A-2C are schematic views of the seat frame and interlock for a seat recliner mechanism of FIG. 1A in a full-forward position according to an exemplary embodiment.
Figure 2C:
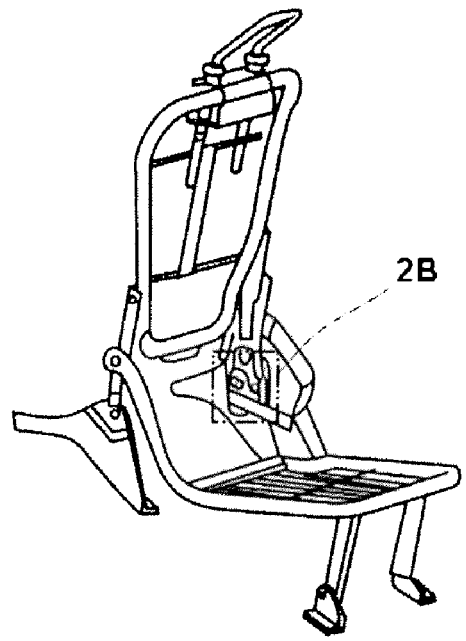
Figure 2B:
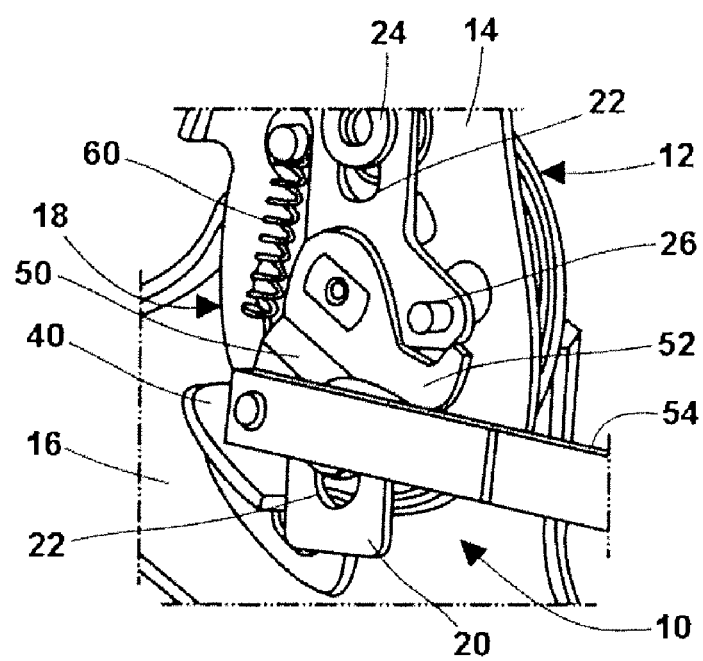
Figure 3:
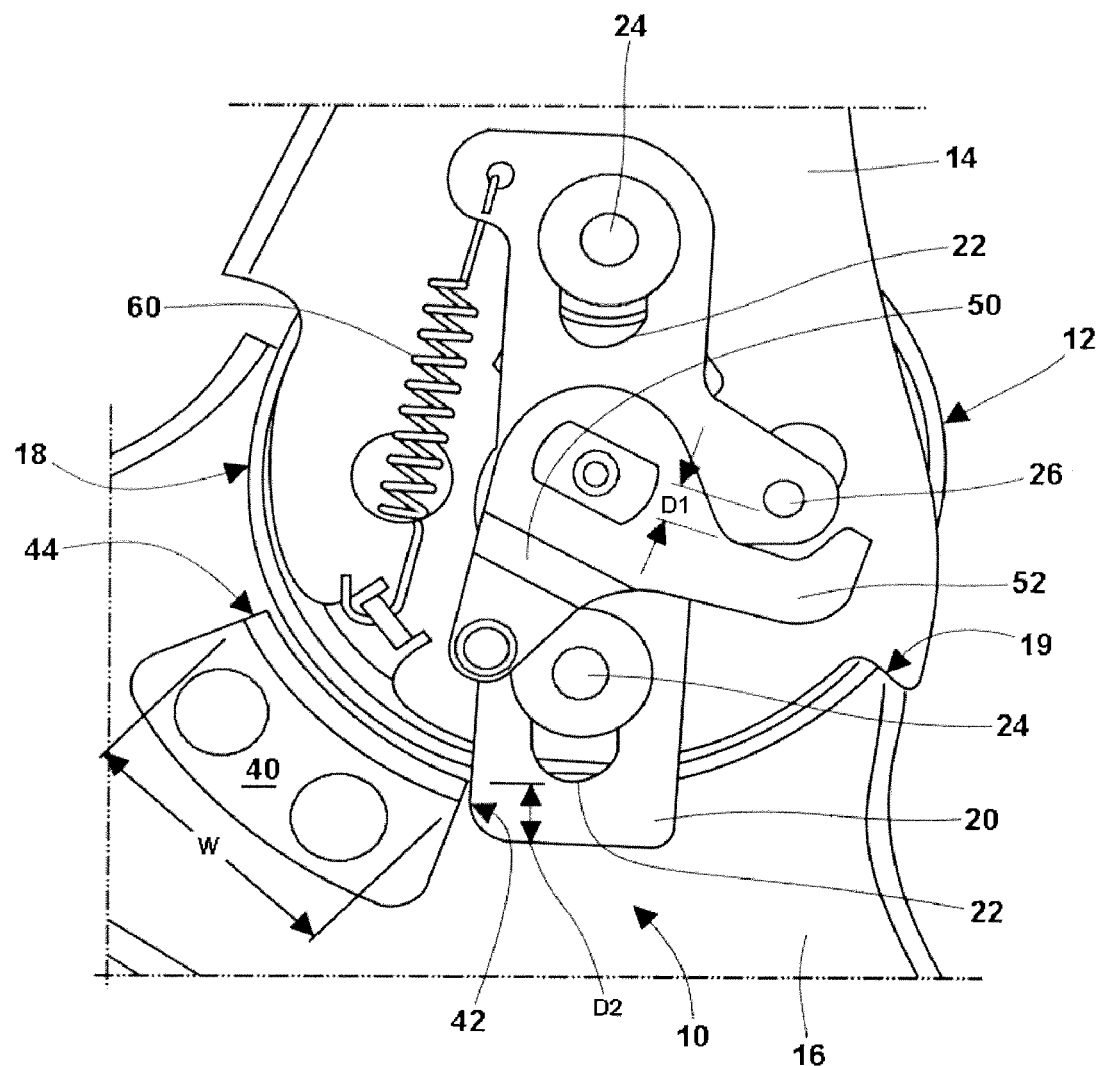
FIG. 3 is a schematic elevation view of an interlock for a seat recliner mechanism of FIG. 1A in the full-forward position according to an exemplary embodiment.
Figure 4A:
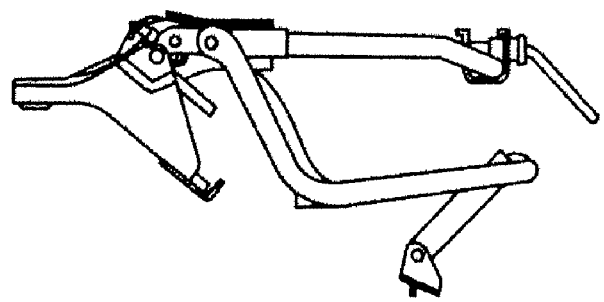
FIGS. 4A-4C are schematic views of the seat frame and interlock for a seat recliner mechanism of FIG. 1A in a fold-flat position according to an exemplary embodiment.
Figure 4B:
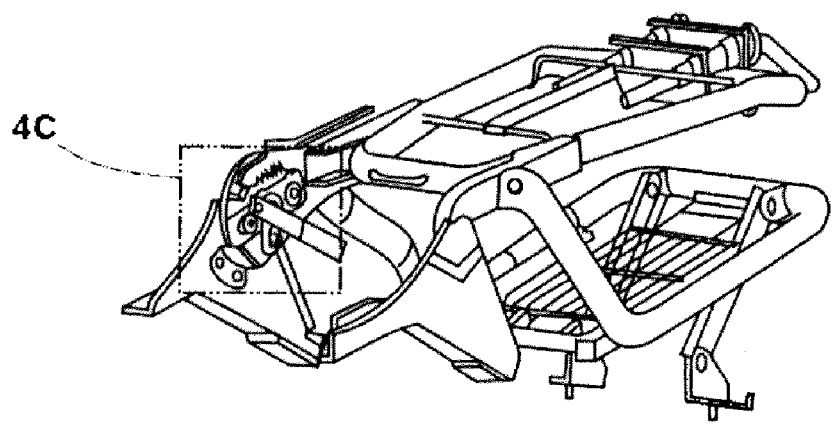
Figure 4C:
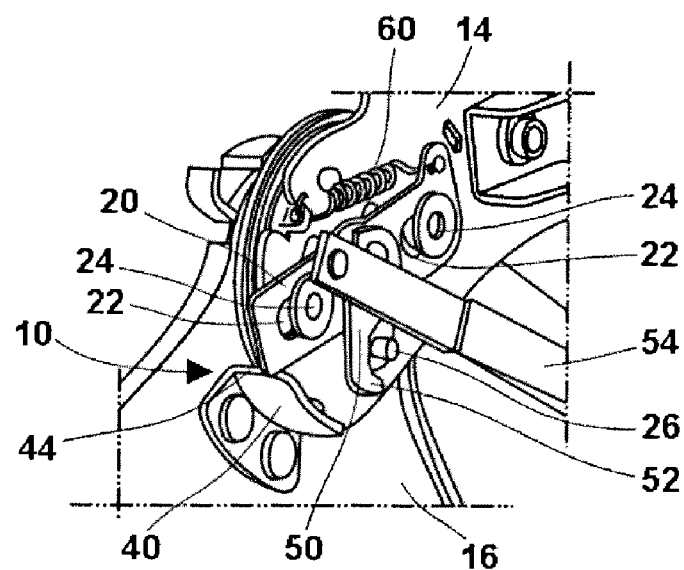
Figure 5:
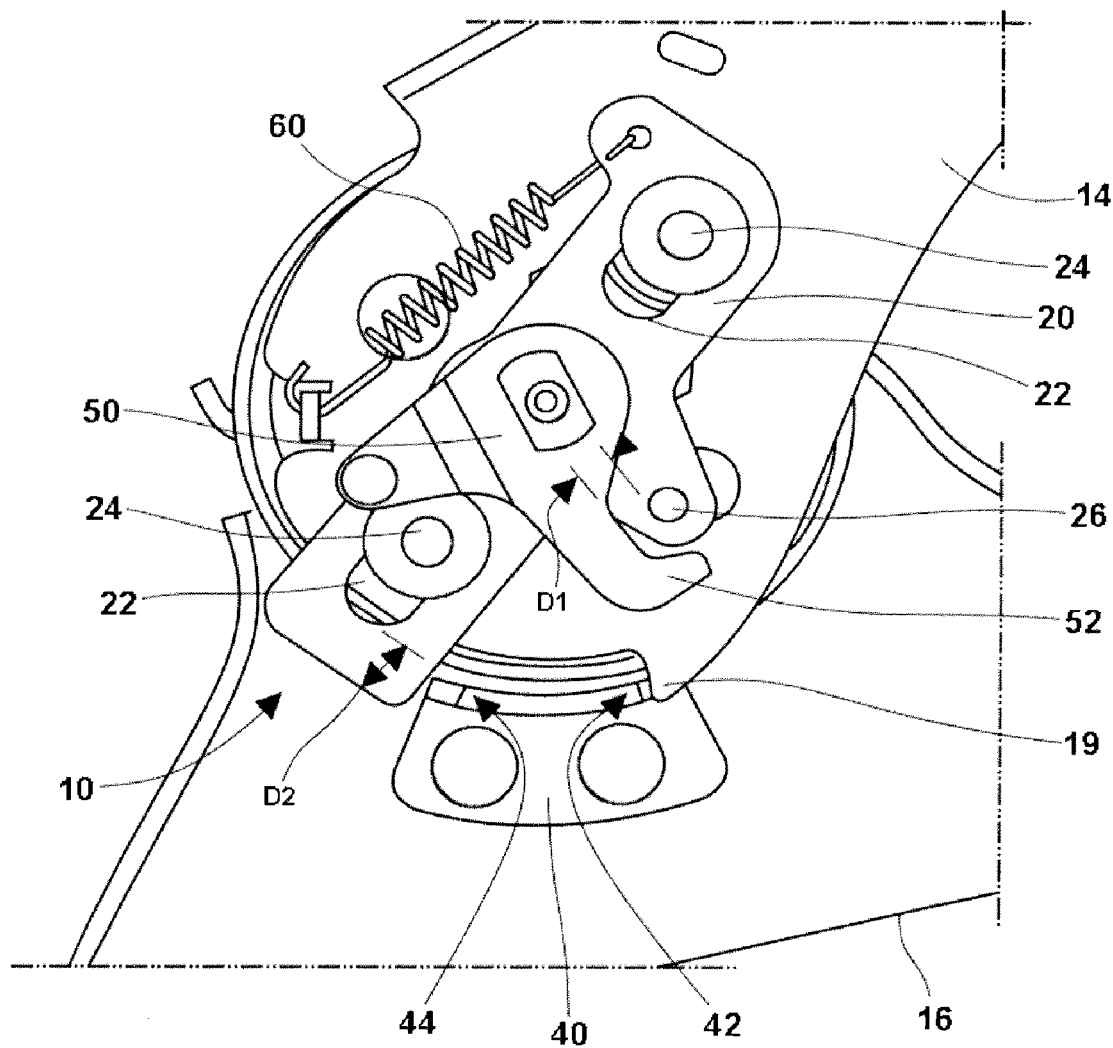
FIG. 5 is a schematic elevation view of the interlock for a seat recliner mechanism of FIG. 1A in the fold-flat position according to an exemplary embodiment.
Figure 7A:
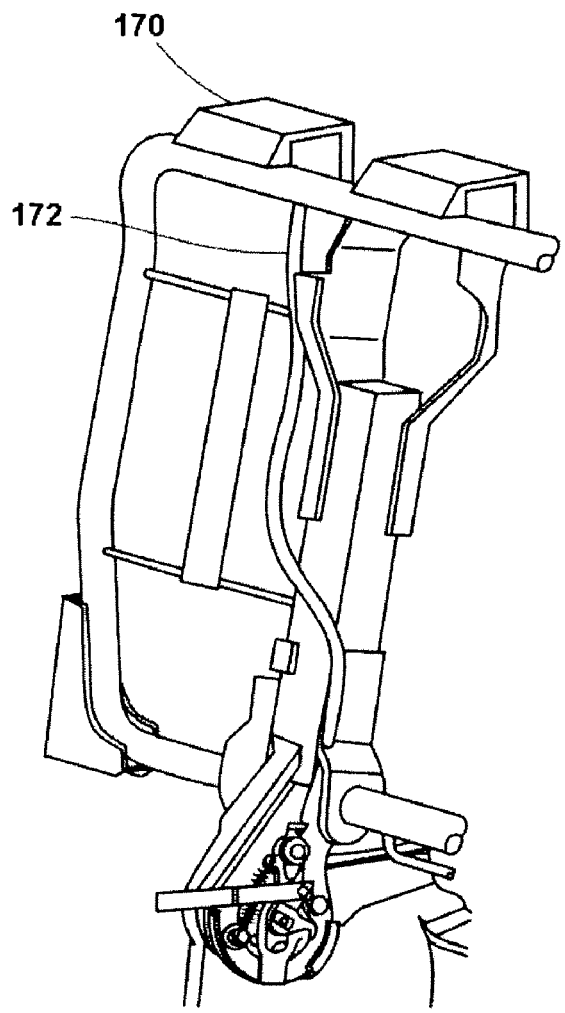
FIGS. 7A and 7B are schematic perspective views of the interlock for a seat recliner mechanism of FIG. 6A in the reclined position according to an exemplary embodiment.
Figure 7B:
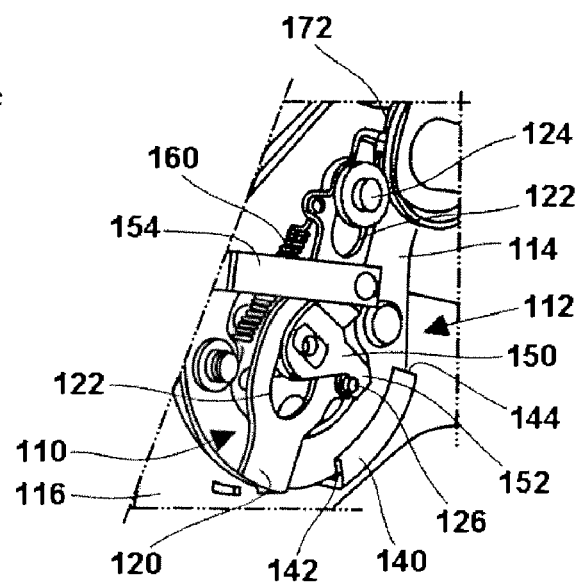
Figure 8:
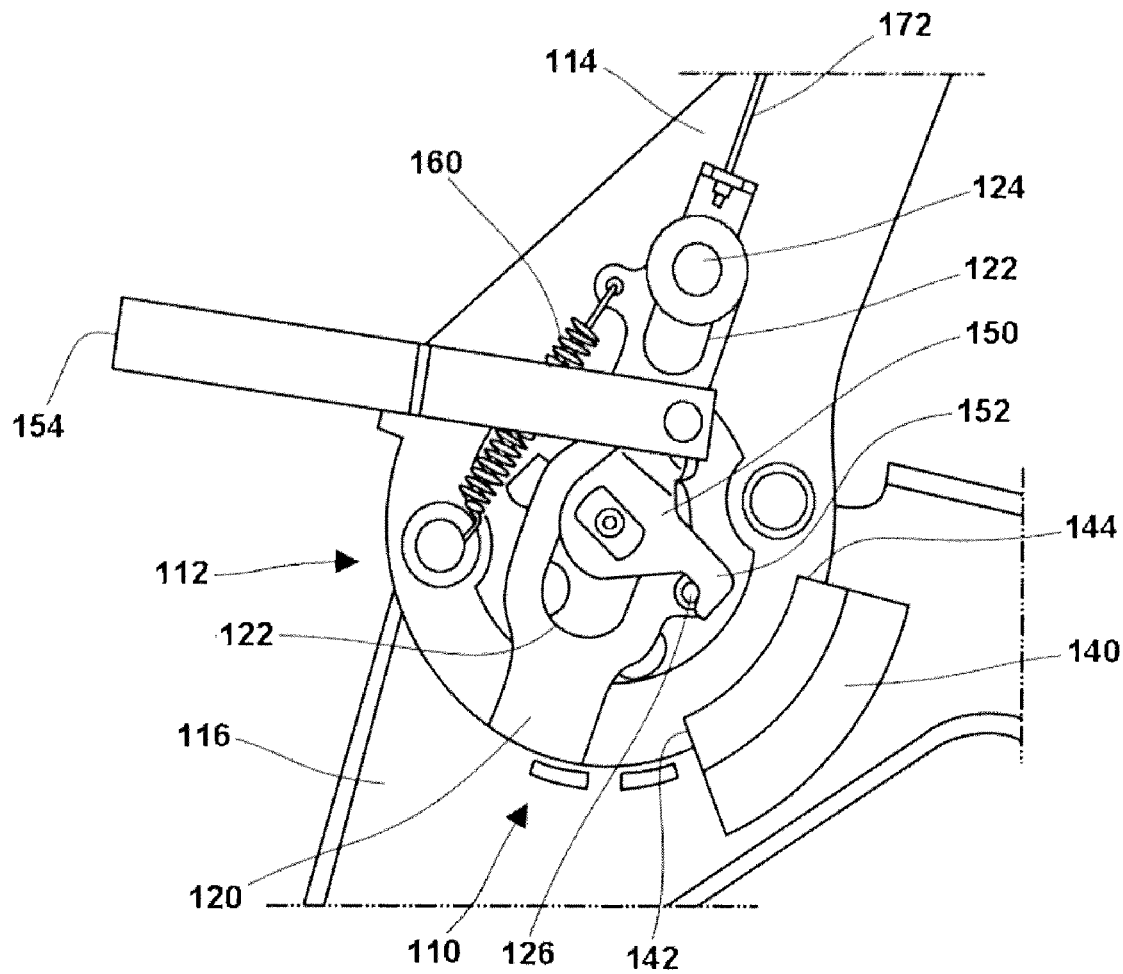
FIG. 8 is a schematic elevation view of the interlock for a seat recliner mechanism of FIG. 6A in the reclined position according to an exemplary embodiment.

According to the illustrated embodiment of FIGS. 1-5, handle 50 is shown as a "single" or "integrated" handle (which may or may not include an extension or "grip portion" 54 shown for example as a "strap" in FIG. 2B) intended to operate both seat recliner mechanism 12 and the interlock device 10. Handle 50 is shown to include a grip portion 54 (see FIGS. 2B and 4C) and a lever portion 52 that are pivotally movable about an axis of the seat recliner mechanism. Grip portion 54 may be moved within a first range to a first position shown as corresponding to a first distance D1 (see FIGS. 3 and 5) to release the seat recliner mechanism and permit adjustment of seatback frame 14 within the seat-use range. In the event that a user desires to fold seatback frame 14 forward, beyond the full-forward position and into the fold-flat position, grip portion 54 may be moved within a second range to a second position shown as corresponding to a second distance D2, in which the seat recliner mechanism remains released and lever portion 52 engages pin member 26 so that lock plate 20 is shifted from the locked position to the released position to permit further forward movement of seatback frame 14 (shown according to the exemplary embodiment as movement in a clockwise direction). As seatback frame 14 is moved toward the fold-flat position, spring 60 biases lock plate 20 toward the locked position so that when seatback frame 14 reaches the fold-flat position, lock plate 20 shifts into the locked position and engages a second end 44 of stop bracket 40 to create a second interlock intended to prevent movement of seatback frame from the fold-flat position until handle 50 is activated (see FIGS. 4C and 5). Referring further to FIG. 5, curved surface 18 on seatback frame 14 is shown to include a stop tab 19 positioned to contact first end 42 of stop bracket 40 to prevent forward movement beyond the fold-flat position. Upon activation of handle 50 into the second range (D2), lock plate 20 disengages second end 44 of stop bracket 40 so that seatback frame 14 is movable to the seat-use range (shown according to the exemplary embodiment as movement in a counterclockwise direction), until seatback frame 14 reaches the full-forward position and spring 60 biases lock plate 20 into the locked position to reestablish the first interlock with first end 42 of stop bracket 40.

According to alternative embodiments, the orientation of the lock plate and stop bracket on the seatback frame and seat bottom frame may be reversed. Also, the spring may be any suitable spring for biasing the lock plate in an intended direction. Further, lock plate may be configured as a pivoting member for engaging the stop bracket to provide the first interlock in the full-forward position and the second interlock in the fold-flat position. The seat-use range between the full-reclined position and the full forward position may have any suitable angular range as desired for a particular vehicle application (e.g. approximately 15 degrees, etc.). According to another alternative embodiment, the interlock device may be configured to provide additional interlocks at other predetermined seatback positions. For example, the stop bracket may be provided with intermediate recesses configured to receive an end of the lock plate, or the stop bracket may be provided in two or more segments.

According to the exemplary embodiment of FIGS. 1-5, the interlock device having a single or "common" handle is intended to permit a user to adjust the positioning of the seatback within a normal adjustment (i.e. seat-use range) by moving the handle in a first manner (e.g. a first distance), and to permit a user to move the seatback beyond the seat-use range and lock the seatback in a fold flat position (such as to provide a cargo storage platform, etc.) by moving the handle in a second manner (e.g. a second distance, beyond the first distance). The width and location of the stop bracket are intended to establish interlocks with the lock plate when the seatback is in the full-forward position to avoid unintended seat "collapse" or "fold-shut" and in the fold-flat position to prevent unintended lifting of the seatback from the cargo storage platform to maintain a uniform platform surface. The single handle is intended to provide, among other features, a relatively simple device that is easily actuated by a user to operate the recliner mechanism and the interlock device.

Referring to FIGS. 6A-10B, a component assembly shown as an interlock device 110 for a seat recliner assembly 112 is shown according to another exemplary embodiment. The interlock of the embodiment of FIGS. 6A-10B is similar to the embodiment illustrated in FIGS. 1-5 but has been modified to provide a two handle operation design. Interlock device 110 is shown to include a lock plate 120 (e.g. slide bar, etc.), a stop bracket 140, a first (seat recliner) actuator (shown as handle member 150), a second (interlock) actuator (shown as handle member or latch 170) and a biasing device (e.g. spring 160 shown as a coil-type spring coupled between a seatback frame 114 and lock plate 120). Lock plate 120 is shown coupled to seat back frame 114 by a pair of slotted apertures 122 engaging a pair of projections (shown as posts 124). Apertures 122 are intended to guide the axially-reciprocating, sliding movement of lock plate 120 between a locked position and a released position. Lock plate 120 is also shown to include a projection (shown as a pin member 126) configured to engage a lever 152 extending from first handle 150 to "release" the seat recliner mechanism when the second handle or latch 170 is activated to move lock plate 120 from the locked position to the released position so that seatback 114 may be moved.

Figure 9A:
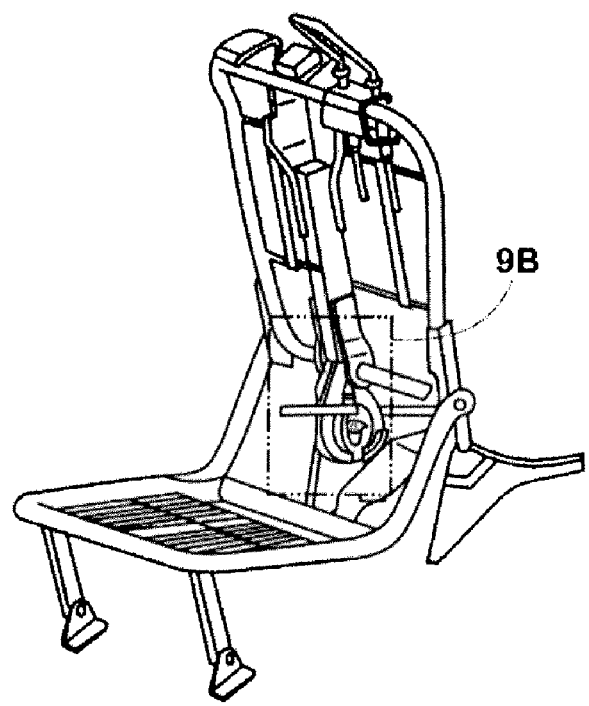
FIGS. 9A and 9B are schematic perspective views of the interlock for a seat recliner mechanism of FIG. 6A in the full-forward position according to an exemplary embodiment.
Figure 9B:
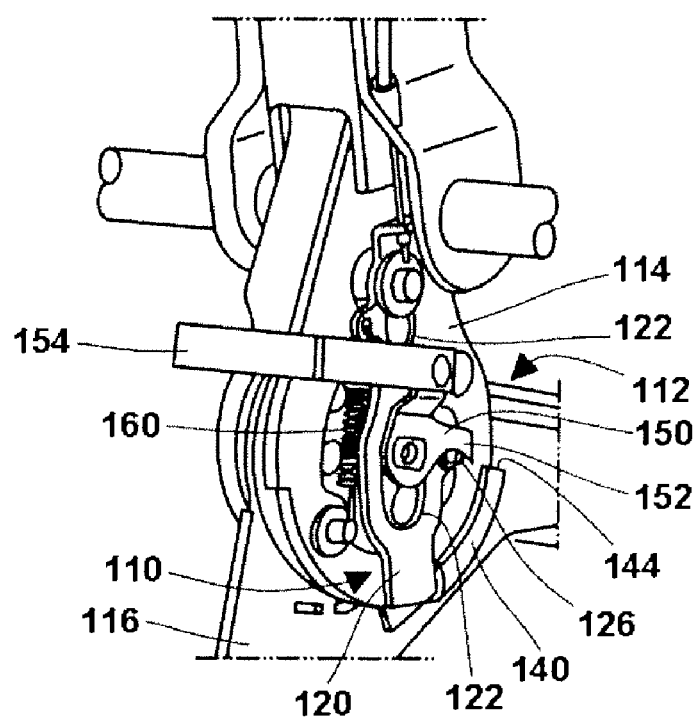
Figure 10A:
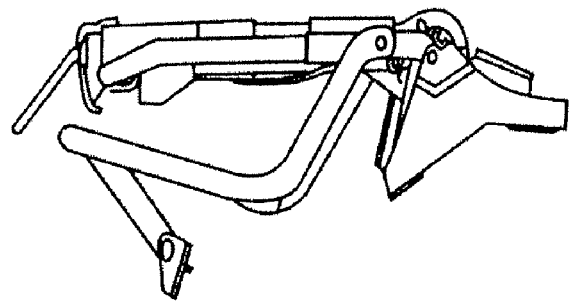
FIGS. 10A and 10B are schematic views of the interlock for a seat recliner mechanism of FIG. 6A in the fold-flat position according to an exemplary embodiment.
Figure 10B:
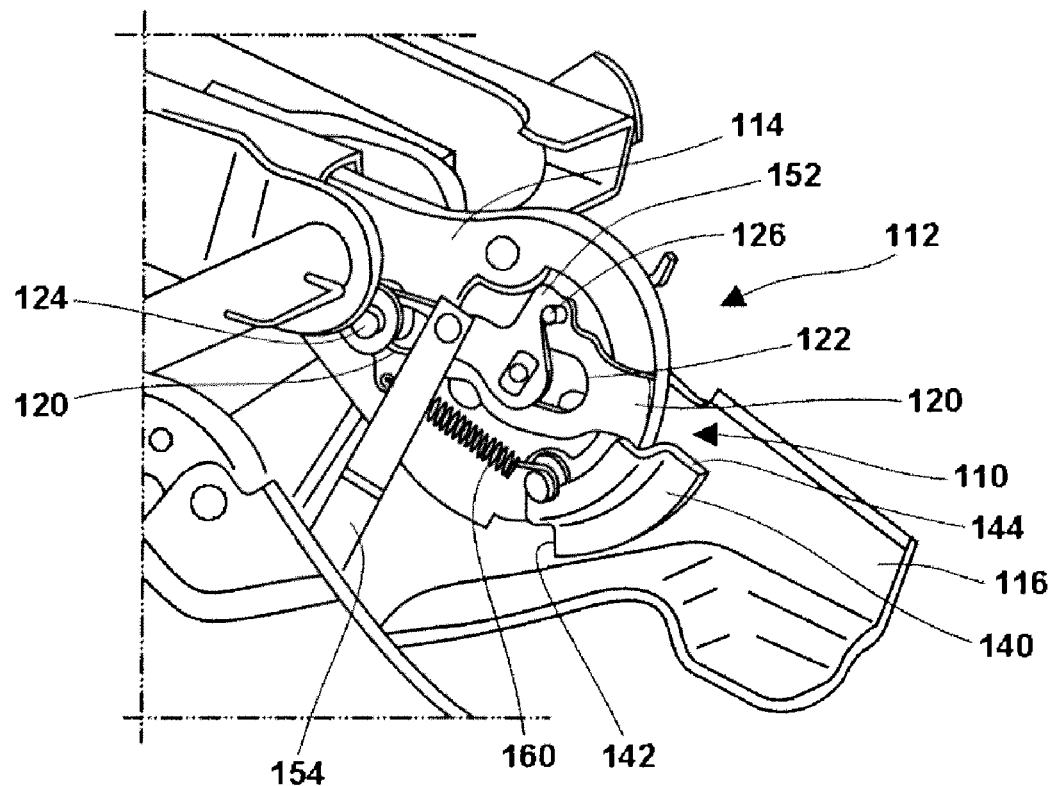

First handle member 150 is shown having an actuating device (shown for example as a "pull strap" 154 in FIGS. 8 and 9B) configured to release the seat recliner mechanism to adjust seatback 114 within the seat-use range with lock plate 120 engaging a first end 142 of stop bracket 140 to prevent seatback movement beyond the full-forward position, as shown in FIG. 9B. According to the illustrated embodiment of FIG. 8, when first handle 150 is activated to adjust the seatback within its normal use range, lever portion 152 moves in a direction away from pin 126 on lock plate 120 (shown according to the illustrated embodiment as movement in a counterclockwise direction).

Second handle member or latch 170 is shown to operably engage lock plate 120 through an extension cable 172 to shift lock plate 120 between the locked position and the released position. When a user desired to release either the first interlock (see FIG. 9B) or the second interlock (see FIG. 10B) to permit seat back 114 to be moved to/from the full-forward position and the fold-flat position, activation of second handle or latch 170 shifts lock plate 120 from the locked position to the released position, and in so doing, pin 126 engages lever 152 to activate first handle 150 and release the seat recliner mechanism so that seatback 114 is movable to a position desired by the user.

According to the exemplary embodiment with the two handle operation design, the first handle is intended to permit a user to access one device (e.g. strap, lever, push-button, etc.) in one location for positioning the seat within the normal seat-use range, and to access a separate, second device (e.g. grab-handle, lift-handle, lever, etc.) to disengage an interlock to permit movement of the seatback to/from the full-forward position of the seat-use range and the fold-flat position (e.g. for cargo storage, etc.).

The construction and arrangement of the elements of the interlock device as shown in the exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements of hardware and accessories, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the interlock device may be constructed from any of a wide variety of materials that provide sufficient strength or durability in any of a wide variety of colors, textures and combinations. Other substitutions, modifications, changes and omissions may be made in the design, operating conditions and arrangement of the preferred and other exemplary embodiments without departing from the scope of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. An interlock device for a seat recliner mechanism, comprising:
   a lock plate linearly slidably mounted to a seatback frame for movement between a locked position and a released position;
   a stop bracket fixed to a seat bottom frame, the stop bracket including a first end configured to engage the lock plate in the locked position when the seatback frame is in a full-forward position to prevent movement of the seatback frame in a forward direction, the stop bracket further including a second end configured to engage the lock plate in the locked position when the seatback frame is in a fold-flat position to prevent movement of the seatback frame in a reverse direction; and
   an actuator engageable with the lock plate, the actuator movable to a first position to release the seat recliner mechanism and movable to a second position, beyond the first position, to linearly move the lock plate toward the released position.

2. The interlock device of claim 1, further comprising a biasing device coupled to the lock plate to urge the lock plate toward the locked position.

3. The interlock device of claim 1, wherein the actuator when moved to the first position is configured to release the seat recliner mechanism without releasing the lock plate so that the seatback frame is adjustable within a seat-use range but is prevented from moving beyond the full-forward position until the actuator is moved to the second position.

4. The interlock device of claim 1, wherein the actuator comprises a first handle for movement to the first position and a second handle for movement to the second position.

5. The interlock device of claim 4, wherein the first handle comprises a grip portion and a lever portion.

6. The interlock device of claim 4, wherein the second handle comprises a cable and a latch.

7. The interlock device of claim 1, wherein the stop bracket has a first end configured to abut the lock plate when the seatback frame is in the full-forward position to define a first interlock.

8. The interlock device of claim 7 wherein the stop bracket has a second end configured to abut the lock plate when the seatback is in the fold-flat position to define a second interlock.

* * * * *